(12) United States Patent
Saxe

(10) Patent No.: US 6,606,185 B2
(45) Date of Patent: *Aug. 12, 2003

(54) SPD FILMS AND LIGHT VALVES COMPRISING LIQUID SUSPENSIONS OF HEAT-REFLECTIVE PARTICLES OF MIXED METAL OXIDES AND METHODS OF MAKING SUCH PARTICLES

(75) Inventor: Robert L. Saxe, New York, NY (US)

(73) Assignee: Research Frontiers Incorporated, Woodbury, NY (US)

( * ) Notice: Subject to any disclaimer, the term of this patent is extended or adjusted under 35 U.S.C. 154(b) by 235 days.

This patent is subject to a terminal disclaimer.

(21) Appl. No.: 09/879,687

(22) Filed: Jun. 12, 2001

(65) Prior Publication Data

US 2002/0186451 A1 Dec. 12, 2002

(51) Int. Cl.$^7$ .............................. G02B 26/00; G02B 5/02
(52) U.S. Cl. ........................................ 359/296; 252/582
(58) Field of Search ................... 359/296; 252/582–584

(56) References Cited

U.S. PATENT DOCUMENTS

| | | | |
|---|---|---|---|
| 1,963,496 A | 6/1934 | Land | 359/296 |
| 2,041,138 A | 5/1936 | Land | 264/1.31 |
| 2,178,996 A | 11/1939 | Land | 516/31 |
| 4,164,365 A | 8/1979 | Saxe | 359/296 |
| 4,247,175 A | 1/1981 | Saxe | 359/296 |
| 4,273,422 A | 6/1981 | Saxe | 359/296 |
| 4,407,565 A | 10/1983 | Saxe | 359/296 |
| 4,422,963 A * | 12/1983 | Thompson et al. | 252/583 |
| 4,877,313 A | 10/1989 | Saxe et al. | 359/253 |
| 5,002,701 A | 3/1991 | Saxe | 252/586 |
| 5,093,041 A | 3/1992 | Check, III et al. | 252/585 |
| 5,204,772 A * | 4/1993 | Hirata et al. | 359/296 |
| 5,279,773 A | 1/1994 | Saxe | 252/585 |
| 5,409,734 A | 4/1995 | Lee et al. | 427/163.1 |
| 5,463,491 A | 10/1995 | Check, III | 359/296 |
| 5,463,492 A | 10/1995 | Check, III | 359/296 |
| 5,516,463 A | 5/1996 | Check, III et al. | 252/585 |
| 5,650,872 A * | 7/1997 | Saxe et al. | 359/296 |
| 6,221,147 B1 | 4/2001 | Sakoske et al. | 106/479 |
| 6,522,446 B2 * | 2/2003 | Saxe | 359/237 |
| 6,529,312 B1 * | 3/2003 | Saxe | 359/296 |

FOREIGN PATENT DOCUMENTS

JP          361151617 A  *  7/1986   ................. 349/122

OTHER PUBLICATIONS

Scientists Belt Out a Novel Nanostructure, *Science News*, vol. 159 (Mar. 10, 2001).

* cited by examiner

*Primary Examiner*—Evelyn Lester
(74) *Attorney, Agent, or Firm*—Cooper & Dunham LLP

(57) ABSTRACT

An electro-optical device including a cell formed of opposed cell walls, a light modulating unit comprising a suspension containing anisometrically-shaped particles formed of a heat-reflective mixed metal oxide, e.g., bismuth manganese oxide, suspended in a liquid suspending medium between the cell walls, and opposed electrodes operatively associated with the cell walls for applying an electrical field across the suspension, wherein the particles have an average length in a range between about 1 micron and about 50 nanometers.

35 Claims, No Drawings

SPD FILMS AND LIGHT VALVES COMPRISING LIQUID SUSPENSIONS OF HEAT-REFLECTIVE PARTICLES OF MIXED METAL OXIDES AND METHODS OF MAKING SUCH PARTICLES

FIELD OF THE INVENTION

The present invention relates in general to particles capable of reflecting heat, especially near-infrared radiation, for use in SPD light valves and in SPD light valve suspensions and films and, more specifically, to anisometrically shaped particles of mixed metal oxides such as bismuth manganese oxide pigments useful for such applications.

BACKGROUND OF THE INVENTION

Light valves have been known for over sixty years for the modulation of light. As used herein, the term "light valve" is defined as a cell formed of two walls that are spaced apart by a small distance, at least one wall being transparent, the walls having electrodes thereon usually in the form of transparent conductive coatings. The cell contains a light-modulating element, which may be either a liquid suspension of particles or a plastic film in which droplets of a liquid suspension of particles are distributed.

The liquid suspension (sometimes herein referred to as "a liquid light valve suspension" or simply a "light valve suspension") comprises small particles suspended in a liquid suspending medium. In the absence of an applied electrical field, the particles in the liquid suspension assume random positions due to Brownian movement, and hence a beam of light passing into the cell is reflected, transmitted or absorbed, depending upon the cell structure, the nature and concentration of the particles and the energy content of the light. The light valve is thus relatively dark in the OFF state. However, when an electric field is applied through the liquid light valve suspension in the light valve, the particles become aligned and for many suspensions most of the light can pass through the cell. The light valve is thus relatively transparent in the ON state. Light valves of the type described herein are also known as "suspended particle devices," or "SPDs".

Light valves have been proposed for use in numerous applications including, e.g., alpha-numeric displays, television displays, windows, sunroofs, sunvisors, filters, mirrors, eyeglasses and the like to control the amount of light passing therethrough or reflected therefrom, as the case may be.

For many applications, as would be well understood in the art, it is preferable for the activatable material, i.e., the light modulating element, to be a plastic film rather than a liquid suspension. For example, in a light valve used as a variable light transmission window, a plastic film, in which droplets of liquid suspension are distributed, is preferable to a liquid suspension alone because hydrostatic pressure effects, e.g., bulging associated with a high column of liquid suspension, can be avoided through use of a film, and the risk of possible leakage can also be avoided. Another advantage of using a plastic film is that, in a plastic film the particles are generally present only within very small droplets and, hence, do not noticeably agglomerate when the film is repeatedly activated with a voltage.

The term, "light valve film" as used herein refers to a film having droplets of a liquid suspension of particles distributed in the film.

U.S. Pat. No. 5,409,734 exemplifies a type of light valve film that is made by phase separation from a homogeneous solution. Light valve films made by cross-linking emulsions are also known. See U.S. Pat. Nos. 5,463,491 and 5,463,492, both of which are assigned to the assignee of the present invention.

For use in set suspensions such as light-polarizing sheets, sometimes called "sheet polarizers", which can be cut up and formed into polarized sunglass lenses or used as filters, light-polarizing particles can be dispersed or distributed throughout a sheet of suitable film-forming material, such as cellulose acetate, polyvinyl alcohol or the like. Methods of making set suspensions for use in sheet polarizers are well known in the prior art. It is important to note, however, that the light-polarizing particles used in light-polarizing sheets are immovable, i.e., fixed. See, e.g., U.S. Pat. Nos. 2,178, 996 and 2,041,138.

The following is a brief description, for the sake of illustration, of the components of a light valve suspension.

1. Liquid Suspending Media and Stabilizers

A liquid light valve suspension for use in the present invention may be any liquid light valve suspension known in the art and may be formulated according to techniques well known to one skilled in the art. The term "liquid light valve suspension" means, as noted above, a "liquid suspending medium" in which a plurality of small particles are dispersed. The "liquid suspending medium" comprises one or more non-aqueous, electrically resistive liquids in which there is preferably dissolved at least one type of polymeric stabilizer which acts to reduce the tendency of the particles to agglomerate and to keep them dispersed and in suspension.

The liquid light valve suspensions useful in the present invention may include any of the liquid suspending media previously proposed for use in light valves for suspending the particles. Liquid suspending media known in the art which are useful in the invention, include, but are not limited to, the liquid suspending media disclosed in U.S. Pat. Nos. 4,247,175 and 4,407,565. In general, one or both of the liquid suspending medium or the polymeric stabilizer dissolved therein is chosen so as to maintain the suspended particles in gravitational equilibrium.

The polymeric stabilizer, when employed, can be a single type of solid polymer that bonds to the surface of the particles but which also dissolves in the non-aqueous liquid or liquids of the liquid suspending medium. Alternatively, two or more solid polymeric stabilizers may serve as a polymeric stabilizer system. For example, the particles can be coated with a first type of solid polymeric stabilizer such as nitrocellulose which, in effect, provides a plain surface coating for the particles. The coated particles are thereafter re-coated with one or more additional types of solid polymeric stabilizer that bond to or associate with the first type of solid polymeric stabilizer and which also dissolves in the liquid suspending medium to provide dispersion and steric protection for the particles. Liquid polymeric stabilizers may also be used to advantage, especially in SPD light valve films, as described in U.S. Pat. No. 5,463,492.

2. Particles

Inorganic and organic particles may be used in a light valve suspension, and such particles may be either light-absorbing or light-reflecting.

Conventional SPD light valves have generally employed polyhalide particles of colloidal size. The term "colloidal" as used herein means that the particles generally have a largest dimension averaging about 1 micron or less. Preferably, the largest dimension of most of the particles used in a light valve suspension should be less than one-half of the wavelength of blue light, i.e., 2000 Angstroms or less, to keep light scatter extremely low. As used herein, the term "anisometric," which refers to particle shape, means that at least one dimension of a particle is larger than another dimension, e.g., the particle length is greater than its width.

A detailed review of prior art polyhalide particles can be found in "The Optical Properties and Structure of Polyiodides" by D. A. Godina and G. P. Faerman published in The Journal of General Chemistry, U.S.S.R. Vol. 20, pp. 1005–1016 (1950).

Herapathite, for example, is a quinine bisulfate polyiodide, and its formula is given under the heading "quinine iodosulfate" as $4C_{20}H_{24}N_2O_2.3H_2SO_4.2HI.I_4.6H_2O$ in The Merck Index, $10^{th}$ Ed. (Merck & Co., Inc., Rahway, N.J.). In polyiodide compounds, the iodide anion is thought to form chains and the compounds are strong light polarizers. See U.S. Pat. No. 4,877,313 and Teitelbaum et al. JACS 100 (1978), pp. 3215–3217. The term "polyhalide" is used herein to mean a compound such as a polyiodide, but wherein at least some of the iodide anion may be replaced by another halide anion. More recently, improved polyhalide particles for use in light valves have been proposed in U.S. Pat. Nos. 4,877,313, 5,002,701, 5,093,041 and 5,516,463. These "polyhalide particles" are formed by reacting organic compounds, usually containing nitrogen, with elemental iodine and a hydrohalide acid or an ammonium halide, alkali metal halide or alkaline earth metal halide.

For the particles to be commercially useful, however, whether or not the light valve suspension is incorporated into a film, it is necessary that the particles have a great chemical and environmental stability. To obtain particles of great environmental stability, in turn, it may be desirable to use non-polyhalide particles in light valve suspensions and films, especially where the stability of the material composing the particles is known to be excellent.

The use of metal particles in light valves was first proposed in U.S. Pat. No. 1,963,496. Many types of metal particles are stable to UV radiation, as well as other environmental stresses. In addition, they are available in a variety of colors, sometimes varying in color as a function of particle size. However, particles comprising two or more metals (mixed metals) and particles comprising mixed metals and oxygen (mixed metal oxides) which, in many cases, are also very stable in response to environmental stresses, have not been previously proposed for use in liquid light valve suspensions, in SPD films, or in light valves.

SUMMARY OF THE INVENTION

The present invention is directed, in a first embodiment, to an electro-optical device comprising a cell formed of opposed cell walls, a light modulating unit comprising a suspension containing anisometrically shaped particles of a heat-reflective mixed metal oxide suspended in a liquid suspending medium between the cell walls, and opposed electrodes operatively associated with the cell walls for applying an electrical field across the suspension. The anisometrically shaped heat-reflective particles have an average length in the range between about 1 micron and 50 nanometers, preferably between about 200 nanometers and 50 nanometers, and most preferably between about 75–180 nanometers. In a further embodiment the anisometrically shaped heat-reflective particles have an aspect ratio, i.e., the ratio of length to width, or of largest dimension to smallest dimension, of at least about 3:1, preferably at least about 10:1 and most preferably at least about 20:1.

In one embodiment of the invention the electro-optical device as described above is a light valve, and the suspension is a light valve suspension. Alternatively, in a preferred embodiment, instead of a purely liquid suspension, the anisometric particles of the invention may be suspended in droplets of liquid suspension distributed throughout a polymeric film.

The anisometrically shaped particles may be produced in a variety of physical forms including, but not limited to, fibrils, rods, cylinders, plates, needles, blades, and prisms.

A wide variety of mixed metal oxide pigments are known in the art, which are capable of reflecting infrared radiation and are thus useful in the present invention. Among these are black pigments of chromium iron oxides and of copper chromium oxides. See U.S. Pat. No. 6,221,147 B1 (Sakoske et al), column 5. Preferred particles for use in the invention, however, comprise black pigments of bismuth manganese oxide. Such particles are also described in detail in U.S. Pat. No. 6,221,147 B1. More preferably the particles comprise $Bi_2Mn_4O_{10}$ crystallized in an orthorhombic crystal structure.

An embodiment of the invention involves the incorporation of a plurality of anisometrically shaped particles, having an average length of between about 50–200 nanometers, into a liquid light valve suspension in order to improve the performance of the light valve suspension. The particles may be any anisometric shape as aforesaid, e.g., fibrils, rods, cylinders, plates, needles, blades or prisms and should have an aspect ratio of at least about 3:1, preferably 10:1 and most preferably 20:1.

An additional embodiment of the invention is directed to a method of preparing the anisometrically shaped particles of the invention. The particles may be prepared as a thin film on a substrate, e.g., a film having a thickness of up to 20 nanometers by any appropriate method known in the art, which film can then be cut by any suitable means such as a microtome or a laser into small plates, for example rectangles or squares measuring 200 nanometers or less on a side. The particles cut from the film are then separated from the substrate and from each other by any appropriate method such as but not limited to ultrasonic agitation. If the substrate is soluble, the substrate can be placed in an appropriate solvent, i.e., one capable of dissolving the substrate, and dissolved, leaving undissolved only the cut film mixed metal oxide, which can be ultrasonically or otherwise dispersed, preferably in the presence of a polymeric dispersing agent to prevent particle agglomeration.

In a further embodiment the invention is directed to a film suitable for use as the light modulating unit of an SPD light valve, the film comprising a cross-linked polymer matrix and having droplets of a liquid light valve suspension distributed in the cross-linked polymer matrix. The light valve suspension comprises a plurality of anisometrically shaped mixed metal oxide heat-reflective particles suspended in a liquid suspending medium. The anisometrically shaped particles have an average length of between about 50–200 nanometers. The particles may be produced from any heat-reflective mixed metal oxide such as would be well known among practicioners of ordinary skill in this art including, but not limited to, bismuth manganese oxide pigments, and in a variety of anisometric shapes including, but not limited to fibrils, rods, cylinders, plates, needles, blades and prisms.

DETAILED DESCRIPTION OF THE INVENTION

The present invention is based on the discovery that suitably sized anisometric heat-reflecting particles comprising mixed metal oxides can be produced and used as the particles of an SPD liquid light valve suspension, and SPD films and light valves. The particles used in the instant light valves can be formed from a variety of metals including, but not limited to, copper, iron, chromium manganese and bismuth, plus oxygen. These particles may be shaped in various geometric forms including, but not limited to, fibrils, rods, cylinders, plates, needles, blades, prisms and other shapes known in the art. The particular geometric form is not critical as long as the particles are anisometric. Particles of the type described herein are advantageous in light valve suspensions because of their great environmental stability and because of their ability to reflect heat (infrared radiation) efficiently, especially near-infrared radiation. This renders SPD devices comprising such particles particularly useful wherein the suspension or the film is exposed, e.g., to sunlight or some other heat source, such as when used in a window for a building, motor vehicle, or aircraft.

Methods of dispersing particles in liquids are also well known in the art. Generally, a polymer soluble in the liquid of the dispersion will bond to and disperse the particles of the present invention if the polymer has in its structure: (1) a sufficient number of polar groups to bond to the particles and (2) low polarity or non-polar groups to dissolve in the liquid suspending medium. Non-limiting examples of low or non-polar groups include alkyl and aryl hydrocarbon groups, and organosiloxane groups. The high polarity groups include, for example, groups such as ionomer, hydroxyl, carboxyl or alkylene oxide such as ethylene oxide. Surfactants and dispersants for use with metal particles are known in the art. See, also, U.S. Pat. Nos. 4,164,365, 4,273,422 and 5,279,773, which are assigned to the assignee of the present invention, and describe suitable copolymers and polymeric dispersion systems for light valve suspensions.

Preferably, no more than five percent of the particles in a suspension of the invention will have a largest dimension of 200 nanometers or more; more preferably one percent or less of the particles will have a largest dimension of 200 nanometers or more; and most preferably, 0.2% or less of the particles will have a largest dimension of 200 nanometers or more.

On the other hand, if the particles have too small a length, a different problem arises. A suspension of very small length particles requires a relatively great amount of voltage to orient the particles, whereas longer particles require less voltage because of their greater torque. Hence, as a practical matter, the particles should preferably have a largest dimension of about 50 nanometers or more. A suspension of anisometric particles should preferably have five percent or less of its particles with a largest dimension less than 50 nanometers; more preferably one percent or less of its particles will have a largest dimension less than 50 nanometers; and most preferably 0.2% or fewer of its particles will have a largest dimension less than 50 nanometers. Thus, the preferred largest dimension of the particles of the invention should range between about 50–200 nanometers.

Useful in the instant invention are mixed metal oxide particles which are prepared in a manner such that anisometric particles having an aspect ratio of about 3:1 or greater, preferably about 10:1 or greater or more preferably of about 20:1 or greater are obtained. It is preferred that the particles have a thickness or diameter which is substantially smaller than the length or width of the particle. The particles useful in the present invention should be dimensioned such that the largest possible dimension is an average of 1 micron or less and preferably an average of 200 nanometers or less. Preferably, the largest average dimension of the particles should range from about 50 to 200 nanometers, more preferably average from about 75 to about 180 nanometers.

In one embodiment of the invention, the particle material may be produced in a sheet or film form by any method known in the art such as, but not limited to, charged vapor deposition or sputtering, following which a laser may be used to scribe the sheet and thus form particles having appropriate dimensions from the sheet material. A particular non-limiting example would be the use of a mixed metal oxide deposited upon a substrate, whereupon the supported sheet or film is thereafter cut into discreet particles of an appropriate size range with, e.g., a laser. The appropriate wavelengths and the procedure for cutting the particular material would be well understood by one of ordinary skill in the field of lasers without the necessity for any undue experimentation. One well-known supplier of lasers which would be useful in the present invention is Lambda-Physik of Fort Lauderdale, Fla., which is affiliated with Coherent, Inc., of Santa Clara, Calif. If desired, the substrate may be formed of a soluble material so that, after cutting the sheet or film to form the particles, the substrate may be dissolved away from the particles using an appropriate solvent, leaving only the undissolved particles behind. The methods for the formation and laser-cutting of such sheets would be well known to those of ordinary skill in the relevant field of art.

In a still further embodiment of the invention, the particles may be prepared, e.g., in the form of a "nanobelt" as described in *Science News*, Vol. 159, p. 149 (Mar. 10, 2001). Such nanobelts may be formed using a variety of semi-conducting metal oxides as starting materials. These belts typically have a width ranging from about 30 to about 300 nanometers and a thickness in the range of about 10–15 nanometers. These ribbon-like structures may either be formed in an appropriate particle size, or else cut down to the desired size using, e.g., a microtome or laser as described above.

Particles of different sizes or size ranges may be separated from one another by known methods such as filtration and centrifugation.

A dispersion of the particles of the present invention may be easily prepared by rapidly mixing them into any suitable light valve liquid, e.g., isopentyl acetate or triethyl trimellitate in the presence of any suitable polymer which acts as a dispersant, such as those described in the prior art.

When a dispersion of the anisometric heat-reflecting mixed metal oxide particles of the invention is placed in a light valve and activated with an AC voltage, visible light transmission through the cell is observed to increase readily.

Each of the patents and other references noted herein is incorporated by reference into the present specification to the degree necessary to comprehend the invention.

It is to be understood that the present invention is not limited in scope by the exemplified embodiments which are intended as illustrations of single aspects of the invention, and embodiments and methods which are functionally equivalent are within the scope of the invention. Indeed, various modifications of the invention in addition to those described herein, will become apparent to those skilled in the art from the foregoing description.

What is claimed is:

1. An electro-optical device comprising a cell formed of opposed cell walls, a light modulating unit comprising a suspension containing anisometrically shaped particles comprising a heat-reflective mixed metal oxide suspended in a liquid suspending medium between said cell walls, and opposed electrodes operatively associated with the cell walls for applying an electrical field across the suspension, wherein said particles have an average length in a range between about 1 micron and about 50 nanometers.

2. The device according to claim 1, wherein said electro-optical device is a light valve and said suspension is a light valve suspension.

3. The device according to claim 1, wherein said electro-optical device is a light-valve and wherein said particles are suspended in droplets of a liquid suspension distributed throughout a polymeric film.

4. The device according to claim 2 or 3, wherein said particles comprise a black pigment of a chromium iron oxide or a black pigment of a copper chromium oxide.

5. The device according to claim 2 or 3, wherein said particles comprise a black pigment of bismuth manganese oxide.

6. The device according to claim 5, wherein said particles comprise $Bi_2Mn_4O_{10}$ having an orthorhombic crystal structure.

7. The device according to claim 2 or 3, wherein said particles have an average length between about 50–200 nanometers.

8. The device according to claim 7, wherein said particles have an average length between about 75–180 nanometers.

9. The device according to claim 2 or 3, wherein said particles have an aspect ratio of at least about 3:1.

10. The device according to claim 9, wherein said particles have an aspect ratio of at least about 10:1.

11. The device according to claim 10, wherein said particles have an aspect ratio of at least about 20:1.

12. The device according to claim 1, wherein said particles are in a form selected from the group consisting of fibrils, rods, cylinders, plates, needles, blades and prisms.

13. The device according to claim 1, wherein the particles are in the form of a nanobelt.

14. The device according to claim 1, wherein a metal portion of said mixed metal oxide is selected from at least one member of the group consisting of copper, iron, chromium, manganese and bismuth.

15. In a liquid light valve suspension, the improvement comprising a plurality of anisometrically shaped particles comprising a heat-reflective mixed metal oxide suspended therein, wherein said particles have an average length of between about 50–200 nanometers.

16. The suspension of claim 15, wherein said particles comprise a black pigment of a chromium iron oxide or a black pigment of a copper chromium oxide.

17. The suspension of claim 15, wherein said particles comprise a black pigment of bismuth manganese oxide.

18. The suspension of claim 17, wherein said particles comprise $Bi_2Mn_4O_{10}$ having an orthorhombic crystal structure.

19. The suspension of claim 15, wherein said particles have an aspect ratio of at least about 3:1.

20. The suspension of claim 15, wherein said particles are in a form selected from the group consisting of fibrils, rods, cylinders, plates, needles, blades and prisms.

21. The suspension of claim 15, wherein said particles are prepared in the form of a nanobelt.

22. A film suitable for use as the light-modulating unit of an SPD light valve, said film comprising a cross-linked polymer matrix and having droplets of a liquid light valve suspension distributed in the cross-linked polymer matrix, said liquid light valve suspension comprising a plurality of heat-reflective mixed metal oxide particles suspended in a liquid suspending medium, wherein said particles have an average length of between about 50–200 nanometers.

23. The film according to claim 22, wherein said particles comprise a black pigment of a chromium iron oxide or a black pigment of a copper chromium oxide.

24. The film according to claim 22, wherein said particles comprise a black pigment of bismuth manganese oxide.

25. The film according to claim 24, wherein said particles comprise $Bi_2Mn_4O_{10}$ having an orthorhombic crystal structure.

26. The film according to claim 22, wherein said particles have an aspect ratio of at least about 3:1.

27. The film according to claim 22, wherein said particles are in a form selected from the group consisting of fibrils, rods, cylinders, plates, needles, blades and prisms.

28. The film according to claim 22, wherein said particles are prepared in the form of a nanobelt.

29. The film according to claim 22, wherein a metal portion of said mixed metal oxide is selected from the group consisting of copper, iron, chromium, manganese and bismuth.

30. A method of preparing the particles of claim 1, said method comprising preparing a sheet or a film of a particle-forming material comprising at least one heat-reflective mixed metal oxide by depositing a coating of said material on to a substrate, cutting said sheet or film into a plurality of discreet particles of a desired size range and thereafter separating the substrate from the particles.

31. The method of claim 30, wherein said particle-forming material is deposited by charged vapor deposition or by sputtering.

32. The method of claim 30, wherein said particle-forming material is coated upon said substrate to a thickness of not greater than about 20 nanometers.

33. The method of claim 30, wherein the coated substrate is cut with a laser or a microtome.

34. The method of claim 30, wherein the coating is separated from the substrate by ultrasonic agitation.

35. The method of claim 30, wherein the substrate is soluble in a solvent and the coating is removed from the substrate by dissolving the substrate with said solvent.

* * * * *